United States Patent
Huizing et al.

(10) Patent No.: US 8,519,882 B2
(45) Date of Patent: Aug. 27, 2013

(54) METHOD AND SYSTEM FOR DETECTING GROUND OBSTACLES FROM AN AIRBORNE PLATFORM

(75) Inventors: Albert Gezinus Huizing, Voorschoten (NL); Maternus Petrus Gerardus Otten, Voorburg (NL); Franciscus Hendrikus Elferink, Noordwijkerhout (NL); Sebastiaan Gerardus Maria Van Dijk, Pijnacker (NL); Eric Itcia, Toulouse (FR); Sébastien Mazuel, Toulouse (FR)

(73) Assignees: Rockwell Collins France, Blagnac (FR); Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 215 days.

(21) Appl. No.: 12/939,035

(22) Filed: Nov. 3, 2010

(65) Prior Publication Data
US 2011/0133979 A1 Jun. 9, 2011

(30) Foreign Application Priority Data
Nov. 4, 2009 (EP) .................................... 09306056

(51) Int. Cl.
*G01S 13/00* (2006.01)
(52) U.S. Cl.
USPC ...... 342/25 R; 342/25 A; 342/25 B; 342/25 F
(58) Field of Classification Search
USPC ............... 342/25 R, 25 A, 25 B, 25 C, 25 D, 342/25 E, 25 F, 29
See application file for complete search history.

(56) References Cited

U.S. PATENT DOCUMENTS

| | | | | |
|---|---|---|---|---|
| 3,582,626 | A * | 6/1971 | Stansbury | 701/301 |
| 4,188,630 | A * | 2/1980 | Milosevic | 342/29 |
| 4,814,994 | A * | 3/1989 | Doane et al. | 701/300 |
| 5,374,932 | A * | 12/1994 | Wyschogrod et al. | 342/36 |
| 6,040,797 | A * | 3/2000 | Hofele | 342/159 |
| 6,400,306 | B1 * | 6/2002 | Nohara et al. | 342/25 R |
| 6,441,772 | B1 * | 8/2002 | Hellsten et al. | 342/25 R |
| 6,765,525 | B2 * | 7/2004 | Bickert et al. | 342/160 |
| 6,801,155 | B2 * | 10/2004 | Jahangir et al. | 342/90 |
| 7,006,034 | B1 * | 2/2006 | Krikorian et al. | 342/159 |
| 7,095,358 | B2 * | 8/2006 | Krikorian et al. | 342/25 B |
| 7,124,027 | B1 * | 10/2006 | Ernst et al. | 701/301 |

(Continued)

OTHER PUBLICATIONS

European Search Report for Application No. 09306056.4, mail date May 11, 2010, 3 pages.

*Primary Examiner* — Jack W Keith
*Assistant Examiner* — Peter Bythrow
(74) *Attorney, Agent, or Firm* — Foley & Lardner LLP

(57) ABSTRACT

This method for detecting ground obstacles from an airborne platform comprises:
a step of illuminating the whole field of view of interest with an electromagnetic wave in the range of 0.1 to 100 GHz;
a step of receiving the echoes with multiple antenna elements from the whole field of interest and of transforming said echoes into a digital signal per antenna element;
a step of combining said digital signals simultaneously in order to obtain simultaneously multiple beams;
a step of Range and Velocity filtering each beam in parallel;
a step of applying on each filtered beam a detection process using a threshold on amplitude to detect potential ground obstacles; and
a step of discriminating said ground obstacles from said potential ground obstacles due to their specific signature in terms of both relative velocity and distance using velocity of the airborne platform.

18 Claims, 8 Drawing Sheets

(56) References Cited

U.S. PATENT DOCUMENTS

| | | | |
|---|---|---|---|
| 7,259,714 B1* | 8/2007 | Cataldo | 342/159 |
| 7,286,079 B2* | 10/2007 | Blunt et al. | 342/159 |
| 7,369,083 B2* | 5/2008 | Budic | 342/159 |
| 7,417,583 B2* | 8/2008 | Wood et al. | 342/123 |
| 7,479,920 B2* | 1/2009 | Niv | 342/65 |
| 8,184,037 B2* | 5/2012 | Huizing et al. | 342/29 |
| 2002/0033765 A1* | 3/2002 | Bickert et al. | 342/162 |
| 2003/0164792 A1* | 9/2003 | Jahangir et al. | 342/90 |
| 2003/0210175 A1* | 11/2003 | Bickert et al. | 342/93 |
| 2004/0178943 A1* | 9/2004 | Niv | 342/29 |
| 2006/0109161 A1* | 5/2006 | Krikorian et al. | 342/25 B |
| 2006/0132354 A1* | 6/2006 | Beard et al. | 342/160 |
| 2006/0152402 A1* | 7/2006 | Krikorian et al. | 342/25 A |
| 2006/0181451 A1* | 8/2006 | Samson, Jr. | 342/160 |
| 2006/0238408 A1* | 10/2006 | Blunt et al. | 342/91 |
| 2006/0238411 A1* | 10/2006 | Fullerton et al. | 342/147 |
| 2006/0238412 A1* | 10/2006 | Blunt et al. | 342/160 |
| 2007/0200750 A1* | 8/2007 | Cataldo | 342/159 |
| 2007/0247353 A1* | 10/2007 | Budic | 342/159 |
| 2009/0174590 A1* | 7/2009 | Huizing et al. | 342/27 |
| 2011/0133979 A1 | 6/2011 | Huizing et al. | |

* cited by examiner

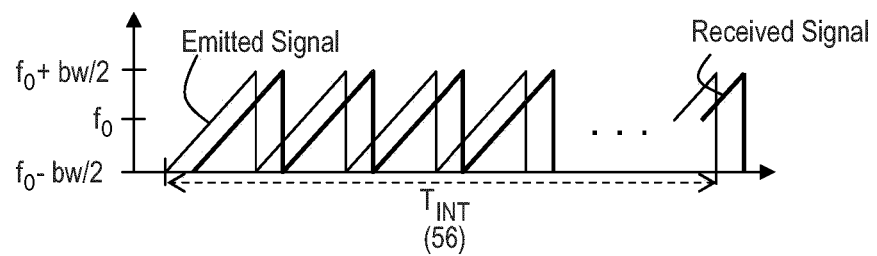
FIG. 2
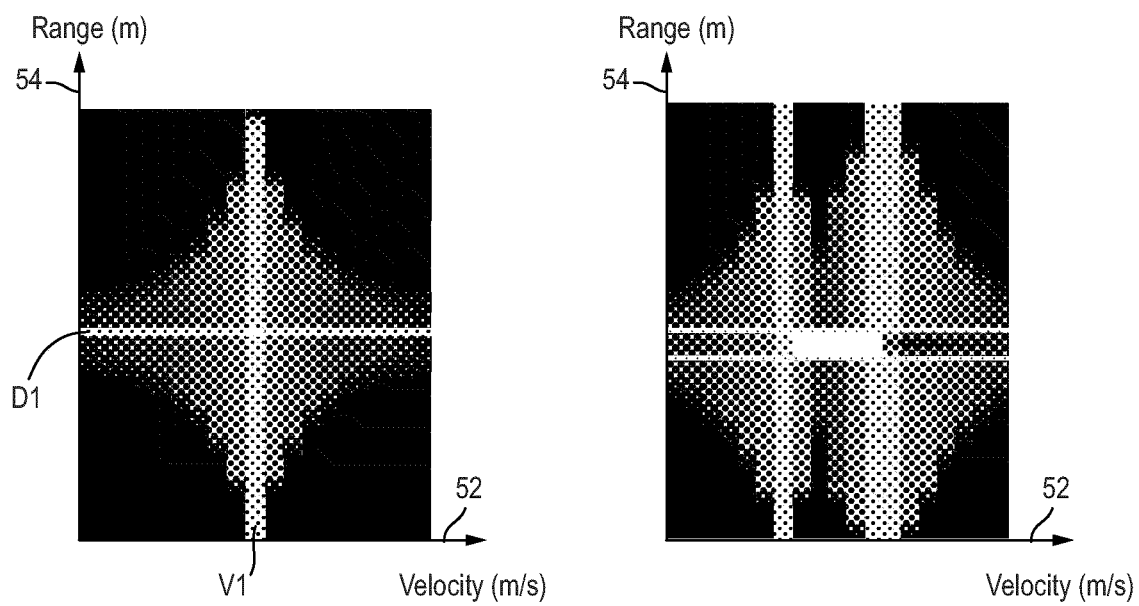
FIG. 3a  FIG. 3b

METHOD AND SYSTEM FOR DETECTING GROUND OBSTACLES FROM AN AIRBORNE PLATFORM

BACKGROUND OF THE INVENTION

The described invention belongs to the area of obstacle detection by an airborne platform.

The invention is more particularly aiming at the detection of ground obstacles. Ground obstacles are here defined as elevated obstacles supported from the ground, such as for example trees, buildings, high voltage wires fixed on pylons, or cable car wires in mountainous areas, and elevated terrain features such as mountains.

State of the art sensors for detecting obstacles comprise laser systems, millimetre wave radars, scanning radars and pulse radars.

Unfortunately, these sensors present severe performance limitations which restrain their operational use. For example, laser and millimetre wave radars suffer from poor visibility in bad weather, while scanning radar only allow achieving low update rate over wide fields of observation. Pulse radars are limited by detection problems at low altitude and short operational range, these limitations being constrained by the pulse length.

Document US2009/0174590 describes a radar system for aircraft which uses a FMCW (Frequency Modulated Continuous Form) signal for detecting presence of approaching airborne systems.

Unfortunately, this radar system is not suitable for detecting fixed low height obstacles from long range, for example obstacles at 15 meters height detected from 1000 meters distance.

OBJECT AND SUMMARY OF THE INVENTION

The invention proposes a method and a system for detecting ground obstacles that does not suffer from the drawbacks of existing state of the art.

More particularly, the invention concerns a method for detecting ground obstacles from an airborne platform, this method comprising:
- a step of illuminating the whole field of view of interest with an electromagnetic wave in the range of 0.1 to 100 GHz;
- a step of receiving the echoes with multiple antenna elements from the whole field of interest and of transforming said echoes into a digital signal per antenna element;
- a step of combining said digital signal simultaneously in order to obtain simultaneously multiple beams covering the whole field of interest using spatial transformation processing;
- a step of Range and Velocity filtering each beam in parallel;
- a step of applying on each filtered beam a detection process using a threshold on amplitude to detect potential ground obstacles; and
- a step of discriminating said ground obstacles from said potential ground obstacles due to their specific signature in terms of both relative velocity and distance using velocity of the airborne platform.

Similarly, the invention concerns a detecting system for detecting ground obstacles from an airborne platform. This detecting system comprises:
- a transmit antenna for illuminating the whole field of view of interest with an electromagnetic wave in the range of 0.1 to 100 GHz;
- multiple antenna elements for receiving the echoes from the whole field of interest and means for transforming said echoes into a digital signal per antenna element;
- means for combining said digital signals simultaneously in order to obtain simultaneously multiple beams covering the whole field of interest using spatial transformation processing;
- filtering means for Range and Velocity filtering each beam in parallel;
- detection means for applying on each filtered beam a detection process using a threshold on amplitude to detect potential ground obstacles; and
- discriminating means for discriminating ground obstacles from these potential ground obstacles due to their difference in relative velocity and distance using velocity of the airborne platform.

Very advantageously, the invention uses a transmission antenna capable of illuminating the whole field of interest at once.

On the receive side, and very effectively, the invention enables to obtain simultaneously multiple beams that cover the whole field of interest, by using a Digital Beam Forming method, known by the man skilled in the art.

In order to cover a large field of surveillance, it is well known and straightforward to implement mechanical scanning.

However, the use of mechanical scanning makes impossible to combine a long integration time, mandatory for detecting small obstacles and wires, with a refresh rate of 2 to 10 Hz, compatible with a wide field of surveillance.

It is remarkable to note that the invention does not require implementing mechanical scanning to cover a large field of surveillance. Therefore and as opposed to scanning radar, the surveillance refresh rate in each beam is only determined by the radar analysis cycle—no mechanical nor electronic scanning rate degrades the refresh rate. The invention very effectively provides both long integration time (radar analysis cycle) and high detection information refresh rate.

Remarkably, the invention proposes to discriminate fixed obstacles in term of height or elevation by discriminating them in a Range Velocity diagram.

The height of an obstacle at a given range corresponds to a specific relative velocity which is distinct from that of same range obstacles of lower height.

Similarly the height of an obstacle at a given relative velocity corresponds to a specific range which is distinct from that of same relative velocity obstacles of lower height.

This difference in velocity for a given range or in range for a given velocity constitutes the specific signature used for discrimination.

In order to efficiently discriminate elevated obstacles, even the relatively small ones at low height (in the order of 15 m height), this double discrimination requires that the transmitted signal covers a large bandwidth (range discrimination) and that the range Velocity filtering is applied during a long integration time (velocity discrimination).

For example, when 16 beams are formed simultaneously over a field of view of interest of 90° in the horizontal dimension and 40° in the vertical dimension, the invention may use a typical transmit signal bandwidth of more than 50 MHz (preferably more than 150 MHz) and a typical integration time of more than 0.1 s (preferably between 0.1 s and 0.5 s).

In a particular embodiment, the discrimination is further based on the evolution of said signature. This is particularly efficient for refining and confirming the discrimination of distant obstacles while approaching them and thus reducing false alarms. To illustrate this evolution of said signature, FIG. 15 represents the specific trajectories, in the Range Velocity domain, of the echoes of 3 ground obstacles of height respectively h1, h2, and h3. Along time, as the range of these obstacles decreases, their echoes will follow different tracks—different signature evolutions—due to their different height. This difference in their trajectory—in their signature evolution—in the Range Velocity domain due to their height difference is used for enhanced height discrimination between ground obstacles.

In a particular embodiment, the discrimination also uses altitude of the airborne platform, in order to discriminate ground echoes and ground obstacles. Knowing airborne platform altitude, ground echoes signature is calculated and used to aid this discrimination.

In a preferred implementation of the invention, the Range and Velocity filtering step comprises a range migration compensation process using the velocity and altitude of the airborne platform.

Due to the platform velocity, obstacles migrate in range during the integration time. It is especially true since this integration time is long, as explained before. Without migration compensation, the obstacles energy would be spread over various range bins. Applying the compensation of this range migration allows focusing the obstacle energy on a single bin of the range Velocity diagram and, as a consequence, improves detection performances.

In a preferred embodiment of the invention, the detection method of the invention further comprises a step of applying a spatial time adaptive (STAP) filtering implemented by forming a specific beam directed to an assumed obstacle (corresponding to STAP hypothesis) and optimizing the signal to ground clutter plus noise ratio. This filtering comprises:

calculating a covariance matrix for at least two beams formed simultaneously of same azimuth;

optimizing a signal to ground clutter plus noise ratio in a given direction by forming a weight vector using said matrix and a steering vector in said direction;

applying said weight vector to said beams and summing channels to form a specific beam directed to the assumed obstacle which optimizes the signal to ground clutter plus noise ratio.

This STAP processing improves detection of the obstacles against ground echoes (ground clutter). The implementation of the STAP principle used in the invention is adaptive in vertical dimension and is tailored to the ground clutter properties in this vertical antenna geometry (high correlation between vertical channels).

In a preferred mode of implementation, the detection of potential obstacles is made using a detection method in which the threshold is an adaptive threshold set taking into account the velocity and/or the altitude of the aircraft.

This allows reducing the false alarm rate by adapting in real time the detection to the obstacles which are hazardous to the airborne platform: the obstacles which are at an altitude close to the airborne platform and which are at a distance that the airborne platform can travel within a given warning time.

In a preferred mode of implementation, the detection step is an optimized CFAR procedure where the ground clutter plus noise estimation is made taking into account a priori knowledge about the ground echoes response.

For instance, cable detection can be greatly improved by estimating the ground clutter plus noise at constant Velocity with Gaussian mask.

This characteristic greatly improves the detection of an obstacle against ground clutter plus noise.

Preferably, the transmitted signal is modulated in FMCW (Frequency Modulated Continuous Wave).

It is to be noted that at first consideration, FMCW would not be retained for an obstacle detection application as stated in document Ref: Pulsed-Velocity DSA Radar—Development Report; Robert Bernier and Pierre Poitevin; Presented at AUVSI 2006, Orlando, Fla., Aug. 30, 2006.

Advantageously, the above mentioned features of the invention enable to efficiently use an operational frequency between 9 and 18 GHz which provides a truly all weather detection capability of detecting small obstacles (RCS in the order of magnitude of 1 $m^2$ or below) and small diameter wires.

In one particular embodiment, the steps of the detection method are determined by computer program instructions.

Consequently, the invention is also directed to a computer program on an information medium, which program can be executed in a computer and includes instructions for executing the steps of a detection method as described above.

This program can use any programming language and take the form of source code, object code or a code intermediate between source code and object code, such as a partially compiled form, or any other desirable form.

The invention is also directed to a computer-readable information medium containing instructions of a computer program as described above.

The information medium can be any entity or device capable of storing the program. For example, the support can include storage means such as a ROM, for example a CD ROM or a microelectronic circuit ROM, or magnetic storage means, for example a diskette (floppy disk) or a hard disk.

Alternatively, the information medium can be an integrated circuit in which the program is incorporated, the circuit being adapted to execute the method in question or to be used in its execution.

BRIEF DESCRIPTION OF THE DRAWINGS

Other features and advantages of the present invention emerge from the description given below with reference to the appended drawings, which show one non-limiting implementation of the present invention. In the figures:

FIG. 2 represents a transmit signal that can be used in a particular embodiment of the invention;

FIGS. 3A and 3B illustrate the benefit of using a range migration compensation process in a particular embodiment of the invention;

DETAILED DESCRIPTION OF ONE IMPLEMENTATION OF THE INVENTION

Figure 1:
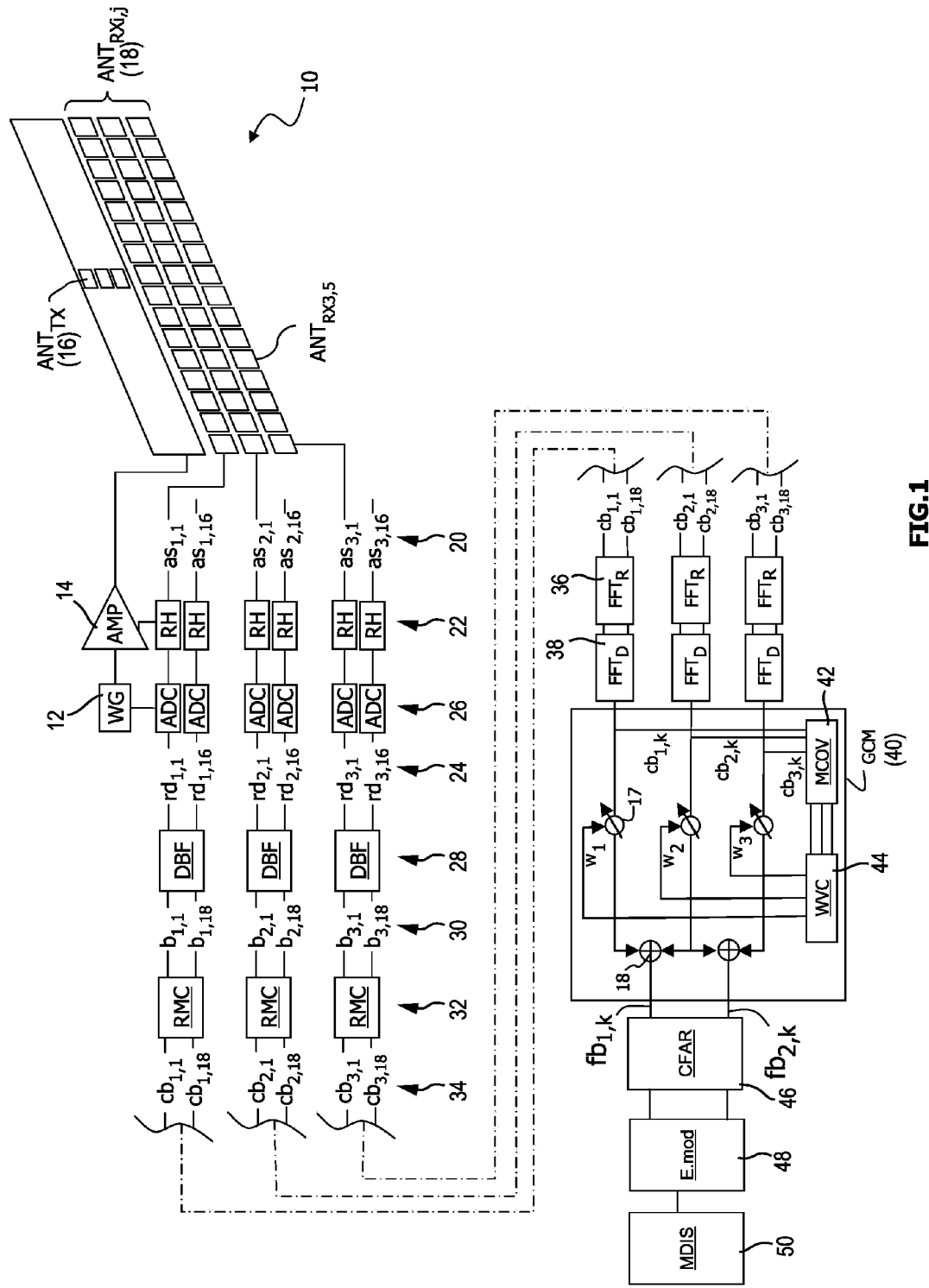
FIG. 1 represents a detection system in accordance with a particular embodiment of the invention.

FIG. 1 represents a detection system 10 in accordance with a particular mode of implementation of the invention.

The detection system 10 comprises transmission means able of transmitting an electromagnetic wave in the whole area of interest, the area of interest being the area in which one wants to detect obstacles.

In the described mode of implementation, these transmission means comprise an electromagnetic wave generator WG, an amplifier AMP and a transmission antenna $ANT_{TX}$.

In the implementation described here, especially aiming at detecting cables from a helicopter, the transmission antenna $ANT_{TX}$ illuminates an angular volume of 100° in horizontal and 40° in vertical.

In the implementation described here, the transmission means transmit an electromagnetic wave in the frequency range of [9 GHz; 18 GHz], which allows good detection, even in heavy rain conditions.

More precisely, as shown in FIG. 2, in the implementation described here, the transmission means transmit a signal at the carrier frequency of 10 GHz with a bandwidth of 150 MHz.

Using a bandwidth higher than 50 MHz is a key feature for Range/Velocity discrimination of obstacles against ground clutter.

In the implementation described here, the transmit signals are FM modulated according to the FMCW principle.

The detection system 10 comprises a matrix of receive antennas $ANT_{Rxi,j}$ capable of receiving the analogue signals echoing from the whole area of interest. In the mode of implementation described here, the detection system 10 holds 48 receive antennas, organized in 3 channels (i varies from 1 to 3) comprising 16 antennas each a varies from 1 to 16).

The analogue signal $as_{i,j}$ at the output of each receive antenna $ANT_{Rxi,j}$ is provided as input to an homodyne receiver RH and then converted into a digital signal $rd_{i,j}$ by an analogue digital converter ADC. It is an unprocessed digital signal (raw data).

For each of the three antenna channels i, the 16 raw digital signals $rd_{i,j}$ (j varies from 1 to 16) are simultaneously combined, in a DBF (Digital Beam Forming) module, to form k multiple beams $b_{i,k}$. These beams are formed according to the principle Digital Beam forming, known by the man skilled in the art, k corresponding to the beam azimuth. The multiple beams are formed in parallel.

In the implementation described here, 18 beams $b_{i,k}$ (k from 1 to 18) are obtained simultaneously for channel i, resulting in 54 beams.

In the implementation described here, the beams have an angular volume of approximately 7° in horizontal direction −6° in forward azimuth direction, increasing in side direction—and 40° in vertical.

In the implementation described here, each of the 3 DBF modules applies a fast Fourier transform.

According to the invention, a Range and Velocity filtering step is applied on each beam in parallel.

In the implementation described here, the Range and Velocity filtering step comprises a range migration compensation process using velocity and altitude of airborne platform 1. The compensated beam corresponding to $b_{i,k}$ is named $cb_{i,k}$.

FIGS. 3A and 3B illustrate the interest of the range migration compensation process used in this embodiment.

More precisely, FIGS. 3A and 3B represent a cross section along the velocity axis V of the range Velocity diagram that would be obtained at the output of the Range and Velocity filtering respectively with and without applying the range migration compensation process RMC.

According to the invention, the filtering of the beam in range and velocity is applied during a long integration time $T_{INT}$, typically more than 100 ms, so that a given obstacle is observed by the aircraft at different distances during this time. We recall that choosing a long integration time $T_{INT}$, for instance 150 ms, improves the velocity discrimination.

FIG. 3B represents the energy $E_{bi,k}$ of an uncompensated beam $b_{i,k}$ for an echo coming from an obstacle during the integration time $T_{INT}$, without applying the range migration compensation process RMC. Because of the motion of the aircraft, it appears that this energy $E_{bi,k}$ is spread over multiple range bins, causing also defocusing in velocity, i.e. spreading over multiple velocity bins.

As shown on FIG. 3A, the range migration compensation process RMC concentrates this energy on a single range and velocity bin, more precisely on the range bin (D1,V1) corresponding to the range of the obstacle at the beginning of the integration cycle.

In the implementation described here, the range migration compensation process RMC comprises:
 calculating the range shift as a function of time, depending on the receive beam direction, derived from the relative radial velocity (function of altitude and velocity of the airborne platform); and
 compensating the range shift separately for each receive beam by applying an opposite range shift. The opposite range shift is performed in a computationally efficient way, by applying a linear phase ramp, separately for each beam, before the range filtering. The range FFT output is therefore shifted in range by an amount determined by the slope of the phase ramp.

Figure 4:
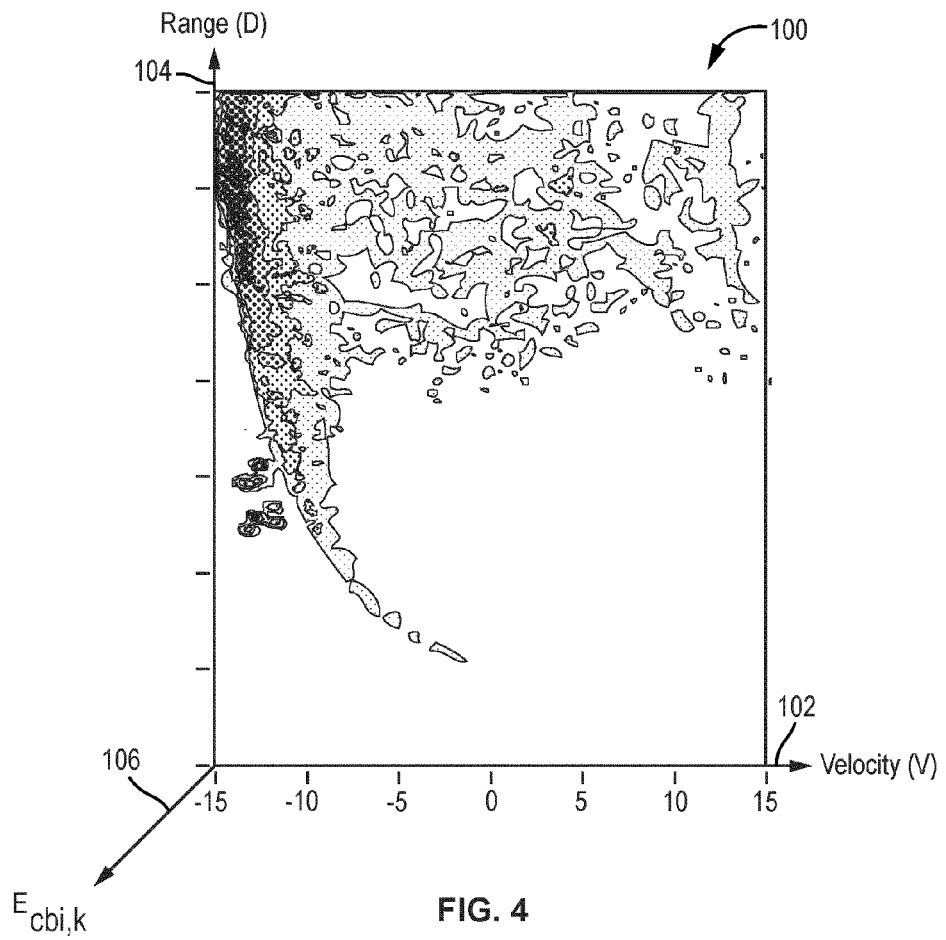
FIG. 4 represents a Range Velocity diagram obtained in a particular embodiment of the invention.

FIG. 4 represents a range velocity diagram $DRD_{cbi,k}$ obtained through the invention, by filtering a compensated beam $cb_{i,k}$ in range (range filtering) and in velocity (Doppler filtering) by two consecutive fast Fourier transforms $FFT_R$, $FFT_D$.

It appears on this figure, that the energies $E_{cbi,k}$ are only a little or even not spread in the range dimension of the range velocity diagram (i.e. at iso Doppler).

Each point of this diagram corresponds to the energy of the compensated beam for an echo coming from an obstacle located at a range D of the airborne platform (or more precisely of the detection system 10 of the aircraft) and with a relative velocity V compared to this airborne platform.

Figure 5:
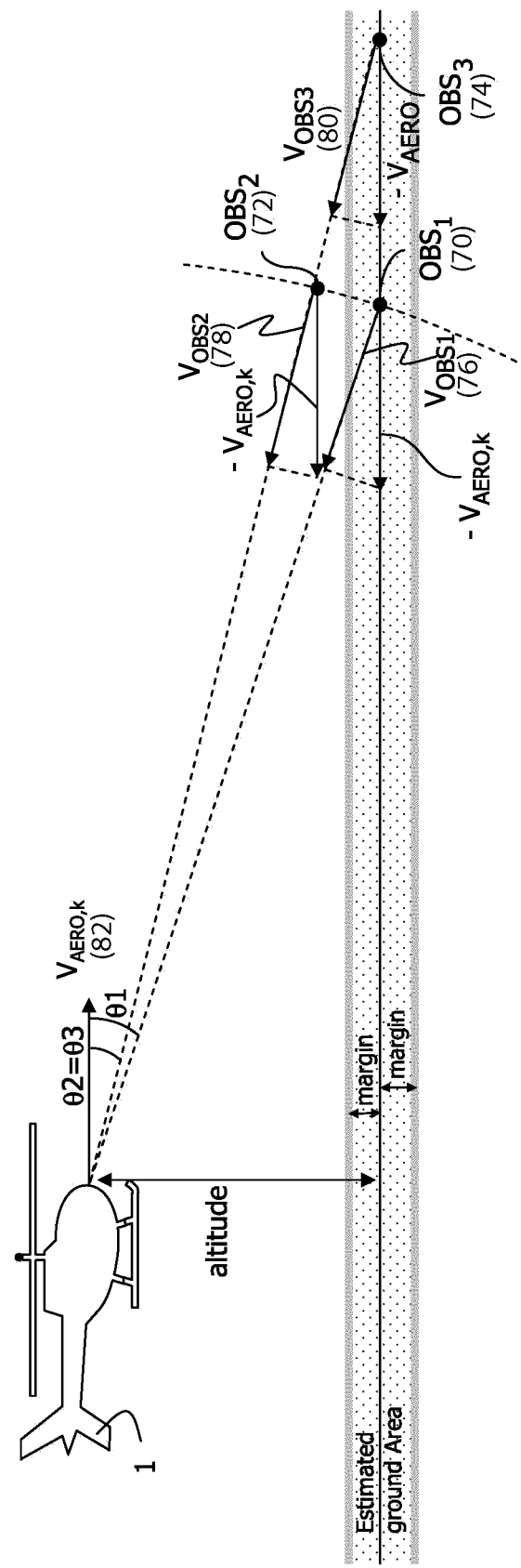
FIG. 5 illustrates the definition of the specific signature in terms of both relative velocity and distance.

To illustrate this definition, FIG. 5 represent 3 obstacles $OBS_1$, $OBS_2$, $OBS_3$, in a vertical plane (iso-azimuth) identified by the index k of the $cb_{i,k}$ beam directed at these obstacles.

The respective radial velocities $V_{OBS1}$, $V_{OBS2}$, $V_{OBS3}$, of the obstacles are computed by $V_{OBSi}=V_{AERO,K} \cdot \cos \theta i$ where:
 $V_{AERO,K}$ is the velocity vector of the aircraft projected in the vertical plane (iso-azimuth) under consideration,
 $\theta i$ is the angle defined by the velocity vector $V_{AERO,K}$ and the line between the airborne platform (1) and the obstacle OBSi.

In the example of FIG. 5, obstacles $OBS_1$ and $OBS_2$ are at the same distance of the aircraft and the obstacles $OBS_2$ and OBS$_3$ are seen by the aircraft with the same relative velocity. Obstacle OBS$_2$ is for instance a cable supported by a pylon not shown. OBS2 is difficult to discriminate by state of the art radars due to its far range and low height (V$_{OBS1}$ and V$_{OBS2}$ being very close).

In the implementation described here, the detection system 10 according to the invention comprises a ground echo cancellation module GCM that performs an adaptive spatial filtering (STAP) on each of the compensated beams in order to maximize the obstacle echo with respect to the ground clutter.

The general theory of the adaptive spatial filtering is known by the man skilled in the art and described particularly in document "Space-Time Detection Theory, William L. Melvin, Georgia Tech Research Institute, 7220 Richardson Road, Smyrna, Ga. 30080, USA. Document presented at <<RTO SET Lecture Series on Military Application of Space-Time Adaptive Processing>>, Istanbul, September 2002, 16, ref: RTO-EN-027".

Figure 6:
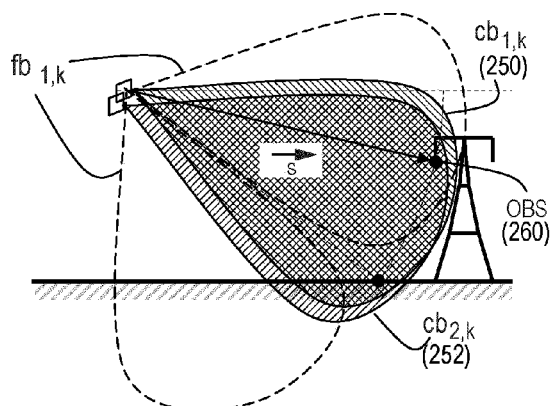
FIG. 6 illustrates the adaptive spatial filtering used in a particular embodiment of the invention.

The principle of such a filtering is shown schematically on FIG. 6. In the implementation mode described, the adaptive filtering module GCM comprises a MCOV module which computes a covariance matrix R for three compensated beams cb$_{1,k}$, cb$_{2,k}$ and cb$_{3,k}$ of same azimuth. The covariance matrix is estimated locally and separately from range-Velocity sub sections in each beam. In the range Velocity subsections where clutter is known in advance to be low, no covariance estimation/STAP is applied in order to prevent degradation and save computation time.

This adaptive filtering module also comprises a WVC module which computes a weight vector w so that $w = R^{-1} \cdot s$, s being the steering that defines the direction of an assumed obstacle OBS (FIG. 6). The weight vector w is formed to optimize the signal to clutter plus noise ratio in the concerned direction.

In the embodiment described here, the weight vector w is applied, to each of the compensated beams cb$_{1,k}$, cb$_{2,k}$ et cb$_{3,k}$, the logical function 17 representing the multiplication by a complex weight.

In the embodiment described here, compensated beams cb$_{i,k}$ are then summed two by two, (logical function 18) to form filtered beams fb$_{m,k}$, in which the signal to noise plus clutter ratio is optimum. For example, beams cb$_{1,k}$ and cb$_{2,k}$ may be summed to form beam fb$_{1,k}$ and beams cb$_{2,k}$ and cb$_{3,k}$ may be summed to form beam fb$_{2,k}$.

The detection system 10 comprises means to detect potential obstacles on the ground, by applying to each of the filtered beams fb$_{i,k}$, a threshold in amplitude which value is adjusted depending on the noise level.

In the described embodiment, these detection means may use a module applying a constant false alarm rate (CFAR) detection, this general technique being well known by the man skilled in the art.

Generally speaking, the CFAR technique consists in estimating the noise level locally, around each bin (D,V) of the range Velocity diagram, and to consider that one bin is a potential obstacle as soon as the energy in this bin is above the local noise level plus a given margin; this level defines a local threshold.

In this step reference is made to a "potential obstacle" since a signal may be strong enough compared to the local threshold level without at the same time representing an actual obstacle. A discrimination module MDIS described below allows distinguishing elevated obstacles among potential obstacles.

In the implementation mode described here, the adaptive threshold is estimated taking into account the velocity and/or the altitude of the aircraft. For example:

- the threshold level may be increased if the helicopter altitude is increased. Rationale is that at higher altitude, hazardous obstacles are also higher hence are easier to discriminate from ground clutter;
- the threshold level is decreased when the velocity is increased. Rationale is that at higher velocity, and in order to provide sufficient warning time, only a little time is authorized to miss detection. Therefore detection probability may be favoured with respect to false alarm probability.

In the implementation mode described here, the local noise level is estimated taking into account a priori knowledge about the ground echoes. More particularly, when the invention seeks to detect cables, the noise level is estimated at constant Velocity, using a Gaussian window (or mask).

Figure 7:
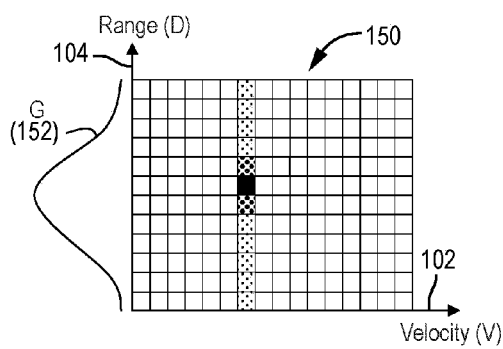
FIG. 7 represents a CFAR mask that can be used in a particular implementation mode of the invention.

FIG. 7 represents a CFAR mask that can be used in a particular implementation of the invention. It allows evaluating the local noise level in a bin of the range Velocity diagram, taking into account only the neighbours of this bin in the vertical dimension of the diagram, the weight of these neighbours being set using a Gaussian law referenced G.

Figure 8:
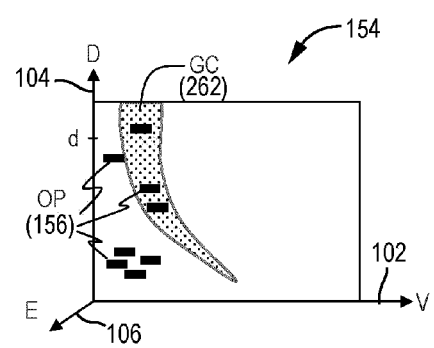
FIG. 8 represents a range Velocity diagram obtained by a detection system according to a particular embodiment of the invention.

FIG. 8 represents in a schematic way the range Velocity diagram at the output of the CFAR module of the detection system 10.

Generally speaking, ground echoes (ground clutter) are located in an area GC of the general L shape of the range Velocity diagram, which energy level is efficiently attenuated by applying the adaptive filtering module GCM.

Potential obstacles identified by the CFAR module are referenced OP on this figure.

In the implementation described here, the detection system 10 according to the invention comprises an elevation calculation module EMod. CFAR provides two inputs to this module, from which vertical angles of potential obstacles are calculated by phase monopulse principle, as known by the man skilled in the art.

The detection system 10 according to the invention additionally holds a discrimination module MDIS to discriminate obstacles among the complete set of potential obstacles identified by the detection module.

In the example of FIG. 5, obstacles OBS$_1$, OBS$_2$ and OBS$_3$ are separated into ground echoes and elevated obstacles.

OBS$_1$ and OBS$_2$ are at the same distance of the aircraft but at different relative velocities, OBS$_2$ and OBS$_3$ are seen by the aircraft with the same relative velocity but at different range.

The discrimination module uses the a priori knowledge of the platform velocity vector to discriminate OBS$_2$ as an elevated obstacle hazardous for the platform. Obstacle OBS$_2$ is for instance a cable supported by a pylon not shown.

In the implementation mode described here, the discrimination module MDIS is based, on the estimation of the area ZE in the range velocity diagram where potential obstacles are considered to be ground echoes using additional a priori knowledge of altitude of the airborne platform. This area ZE is defined in the range velocity diagram as a function of altitude and the velocity of the aircraft.

In this embodiment, discrimination is also based on signature evolution (continuity and coherence of detections in time).

Figure 9:
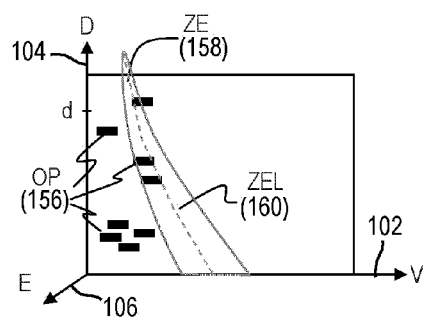
FIG. 9 represents a zone estimated during a discrimination step of a detection method according to a particular embodiment of the invention.

In the implementation example described here the discrimination is reinforced by estimation of the vertical angle provided by elevation calculation module EMod In the implementation example described here, shown on FIG. 9, this area ZE is built around the ZEL line. ZEL is defined by the equation:

velocity=$V_{AERO,k}$·cos θ; with θ=Arcsine(altitude/range).

ZE area boundaries are defined by equations:

velocity=$V_{AERO}$·cos θ; with θ=Arcsine((altitude−fixed margin)/range)

velocity=$V_{AERO}$·cos θ; with θ=Arcsine((altitude+fixed margin)/range)

The area ZE is therefore fully defined by $V_{AERO,K}$ and the airborne platform altitude.

Figure 10:
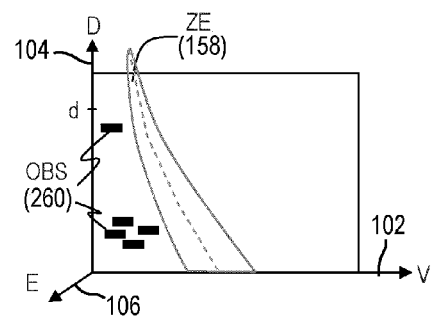
FIG. 10 represents obstacles detected by a detection method according to a particular embodiment of the invention.

The discrimination consists, in the example of implementation described here, in considering that the potential obstacles OP that are located in the estimated area ZE are not hazardous to the platform because their height is too low, the hazardous detections being located outside the estimated area (cf. FIGS. 9 and 10)

It is to be noted that in FIG. 5 only obstacle $OBS_2$ will be discriminated as ground obstacle. $OBS_1$, $OBS_3$ and any other elevated obstacle included in the estimated ground area will not be retained as ground obstacle.

Figure 11:
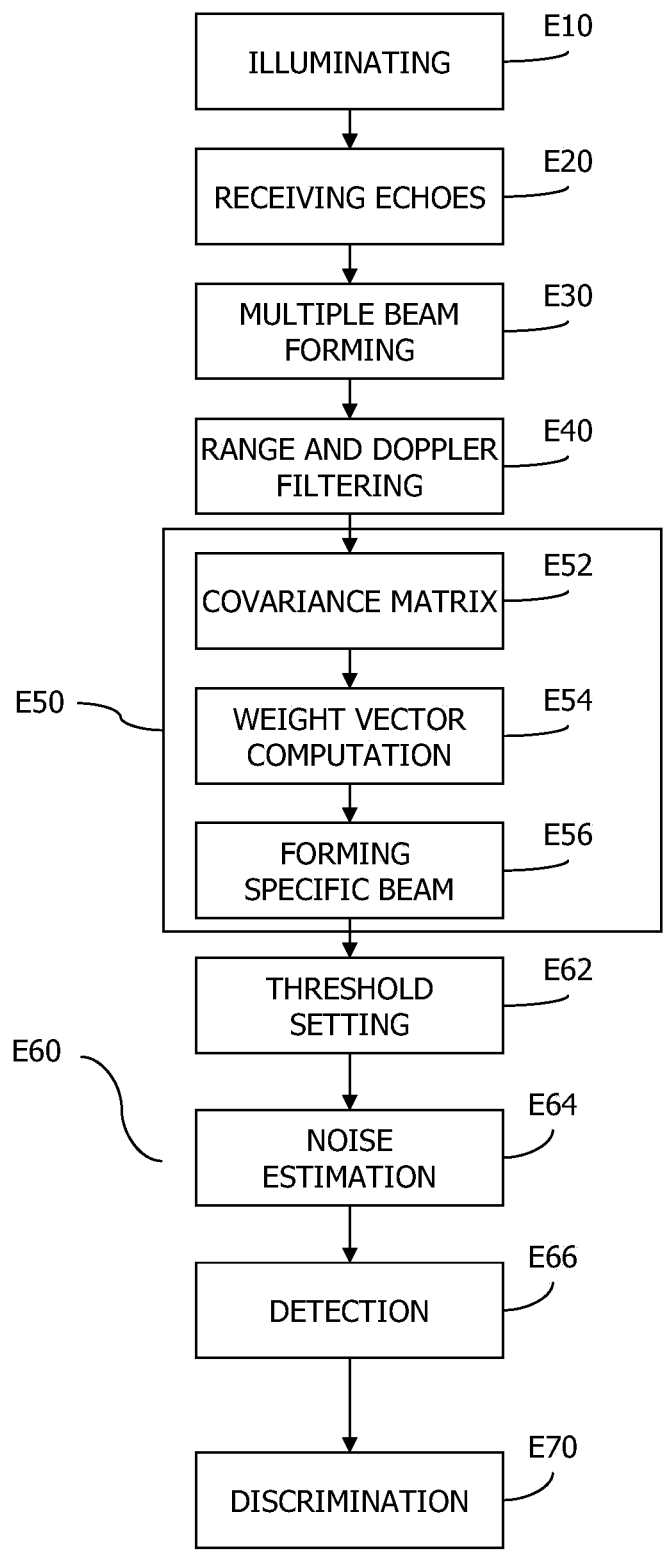
FIG. 11 represents in flowchart form the main steps of one particular embodiment of a detection method of the invention.

FIG. 11 represents in flowchart form the main steps of one particular embodiment of a detection method of the invention.

In this embodiment, the detection method comprises a step E10 of illuminating the whole field of interest with a transmission antenna $ANT_{TX}$.

Step E10 is followed by a step E20 of receiving the echoes with the multiple antenna elements $ANT_{Rxi,j}$ from the whole field of interest and of transforming these echoes into a digital signal $rd_{t,j}$ per antenna element.

Step E20 is followed by a step E30 of combining these digital signals simultaneously using spatial transformation processing for forming multiple beams $b_{i,k}$ simultaneously.

Step E30 is followed by a step E40 of applying a range migration compensation process to each beam using said velocity and altitude of said airborne platform; and of applying a Range and Velocity filtering to each beam compensated beam in parallel.

Step E40 is followed by a step E50 of applying a spatial time adaptive filtering implemented by forming a specific beam $fb_{m,k}$ directed to an assumed obstacle and optimizing the signal to clutter plus noise ratio. In this embodiment, this filtering step E50 comprises:

a sub-step E52 of calculating a covariance matrix for three beams $cb_{1,k}$, $cb_{2,k}$, $cb_{3,k}$, formed simultaneously, of same azimuth k;

a sub-step E54 of optimizing a signal to ground-noise ratio in a given direction by forming a weight vector w using the covariance matrix R and a steering vector s in said direction;

a sub-step E56 of applying the weight vector w to beams $cb_{1,k}$, $cb_{2,k}$ et $cb_{3,k}$ and summing channels to form a specific beam $fb_{1,k}$ directed to the assumed obstacle which optimizes the signal to clutter plus noise ratio.

Step E50 is followed by a step E60 of applying on each filtered beam a detection process using an adaptive threshold on amplitude to detect potential ground obstacles.

In this embodiment this detection step E60 implements a CFAR technique comprising:

a sub-step E62 of determining the adaptive threshold margin using at least the velocity or the altitude of the airborne platform 1; and a sub-step E64 of noise estimation using a priori ground clutter knowledge.

a sub-step E66 of applying the threshold determined by adding the adaptive margin and estimated noise Step E60 is followed by a step E70 of discriminating ground obstacles from the potential ground obstacles due to their signature in relative velocity and distance using velocity and altitude of the airborne platform.

In another possible implementation of the invention, the discrimination is based on height difference between airborne platform and potential obstacles determining an area ZH within which obstacles are discriminated and identified as elevated obstacles hazardous for the platform. This other possible implementation does not use the airborne platform altitude information.

Figure 12:
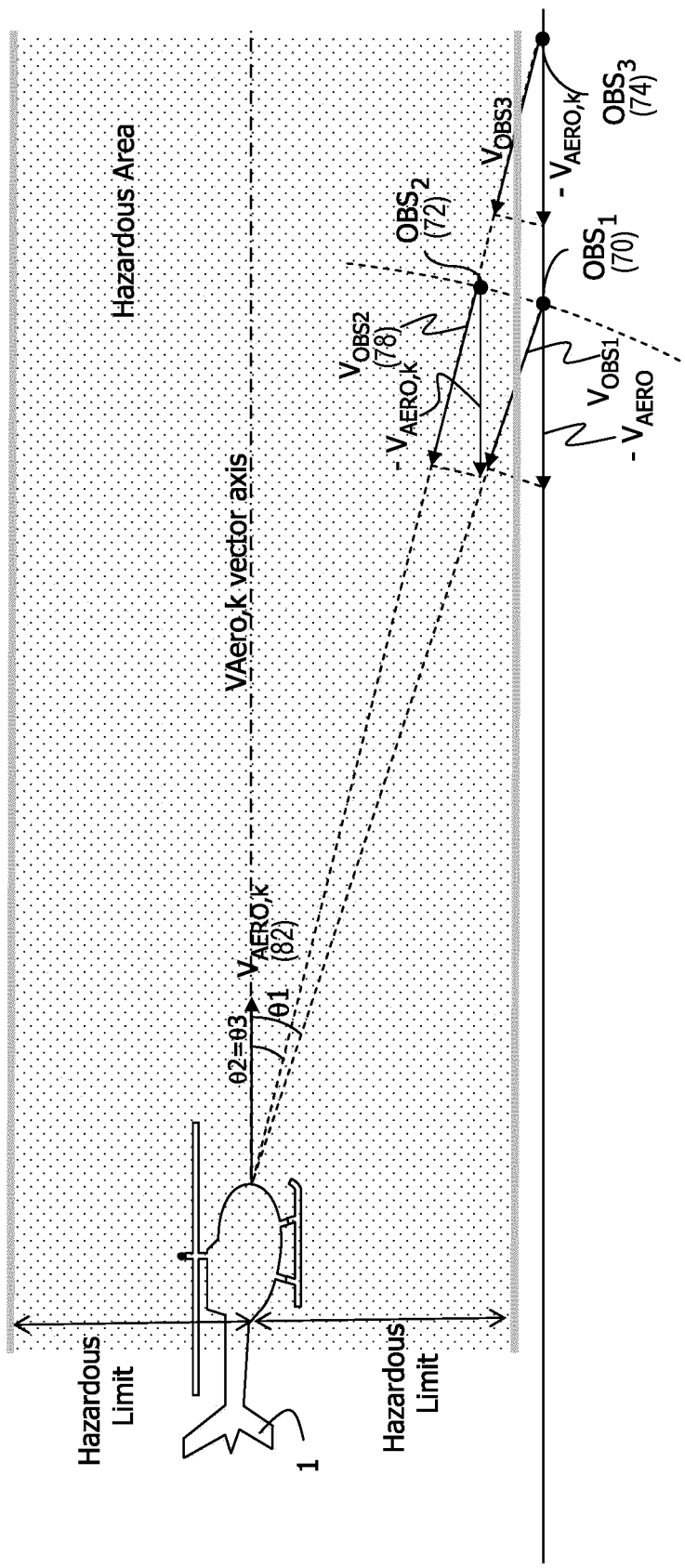
Figure 15:
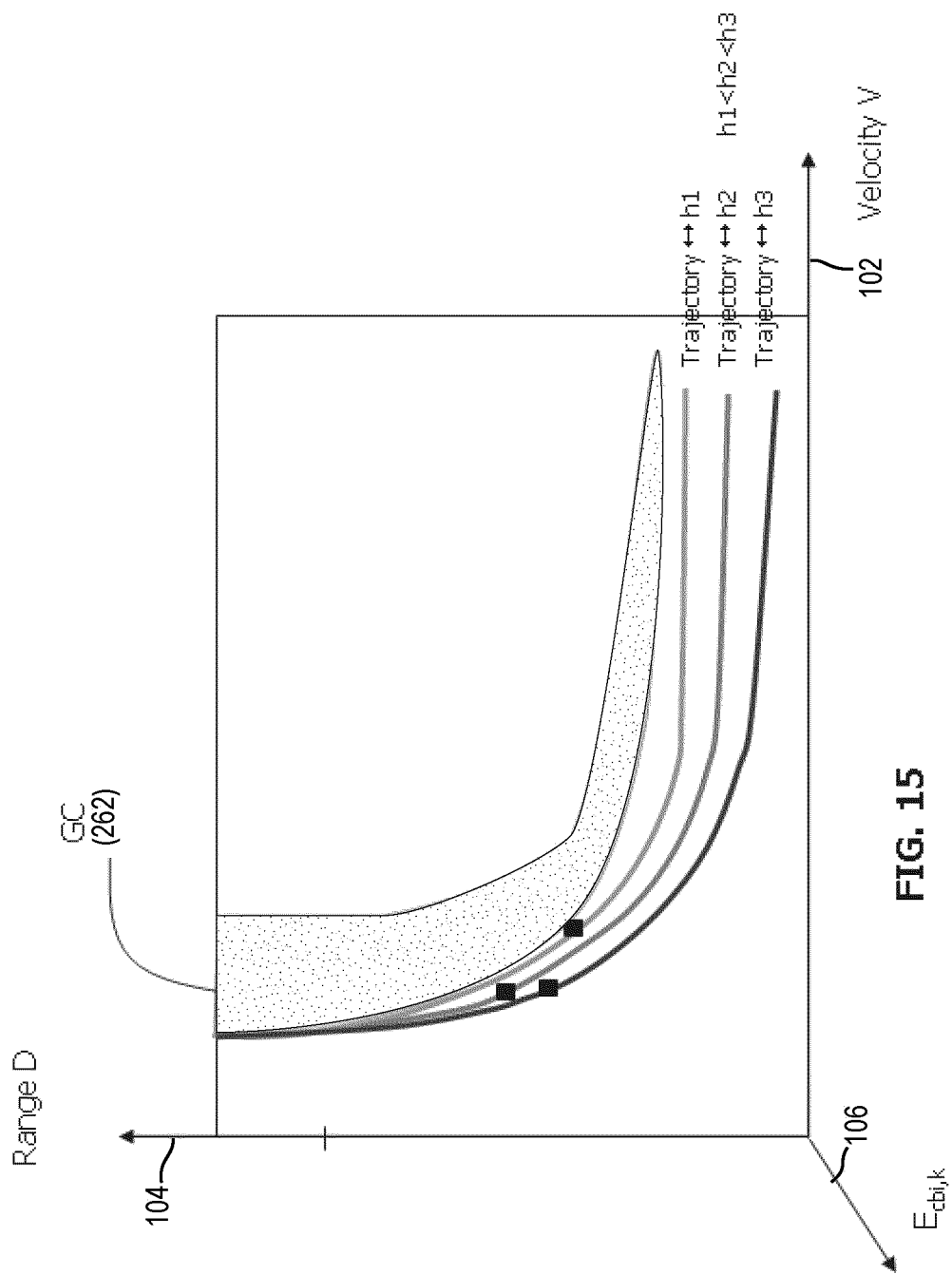
FIG. 15 already described represents trajectories in the Range Velocity domain.

To illustrate this definition, FIG. 12 represent 3 obstacles $OBS_1$, $OBS_2$, $OBS_3$, in a vertical plane (iso-azimuth) identified by the index k of the $cb_{i,k}$ beam directed at these obstacles.

The hazardous area shown in FIG. 12 is defined by the set of points such that their perpendicular distance to the $V_{AERO,K}$ vector axis is smaller than a Hazardous Limit. This Limit can be either user defined or adaptive.

Figure 13:
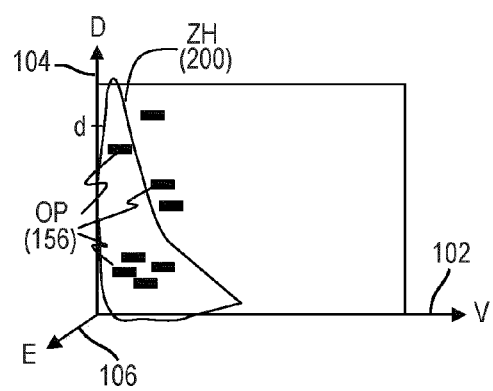
FIGS. 12 to 14 illustrate another discrimination step that can be used in a particular embodiment of the invention.

This area corresponds to a zone ZH in the range velocity domain (FIG. 13) which boundaries are defined by equations:

velocity=norm of the $V_{AERO,K}$ vector (iso-velocity line)

velocity=$V_{AERO,K}$·cos θ;

with θ=Arcsine(hazardous height difference/range)

Area ZH therefore is fully defined by $V_{AERO,K}$ and the fixed hazardous height difference and is independent of airborne platform altitude which is unknown in this implementation.

Figure 14:
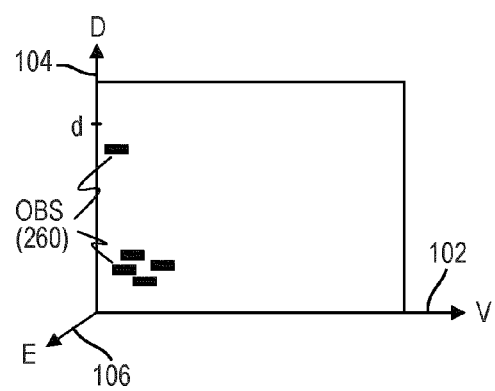

All potential ground obstacles which are included in this ZH area are discriminated as ground obstacles as shown in FIG. 14.

It is to be noted that in FIG. 12 only obstacle $OBS_2$ will be discriminated as ground obstacle. Obstacles $OBS_1$, $OBS_3$ and any other elevated obstacle which height is such that it is not included in the hazardous area will not be discriminated as ground obstacle.

What is claimed is:

1. A method for detecting ground obstacles from an airborne platform comprising:

illuminating a whole field of view of interest with an electromagnetic wave in a range of 0.1 to 100 GHz using a transmit antenna;

receiving data from echoes obtained from the whole field of view of interest using multiple antenna elements;

transforming, using a detection system comprising a processor, the data from the echoes into a digital signal for each of the multiple antenna elements;

combining, the detection system, the digital signals simultaneously in order to obtain simultaneously multiple beams covering the whole field of view of interest using spatial transformation processing;

filtering, using the detection system, each beam in parallel utilizing a range and velocity filtering procedure over a long integration time so that a given ground obstacle is observed at different distances over the integration time;

applying, using the detection system, on each filtered beam a detection process, wherein the detection process utilizes a threshold on amplitude to detect potential ground obstacles; and discriminating, using the detection system, the ground obstacles from the potential ground obstacles in a range velocity diagram based on a velocity of the airborne platform and a height or elevation of the ground obstacles, wherein the height or elevation of a ground obstacle constitutes a specific signature in terms of both a relative velocity and a relative distance, wherein the height or elevation of an obstacle at a given range corresponds to a specific relative velocity which is distinct from that of ground obstacles at a same range and having a lower height or elevation, and wherein the height or elevation of an obstacle at a given relative velocity corresponds to a specific range which is distinct from that of ground obstacles having a same relative velocity and a lower height or elevation.

2. The method of claim 1, wherein the step of discriminating also uses an altitude of the airborne platform.

3. The method of claim 1, wherein the range and velocity procedure includes a range of migration compensation process using the velocity and an altitude of the airborne platform.

4. The method of claim 1, further comprising applying a spatial time adaptive filtering implemented by forming a specific beam directed to an assumed obstacle and optimizing a signal to ground clutter plus noise ratio, the filtering including calculating a covariance matrix for at least two beams formed simultaneously of the same azimuth, the filtering further including optimizing a signal to ground-noise ratio in a given direction by forming a weight vector using the covariance matrix and a steering vector in the direction, the filtering further including applying the weight vector to the beams and summing channels to form a specific beam directed to the assumed obstacle which optimizes the signal to clutter plus noise ratio.

5. The method of claim 1, wherein the threshold is an adaptive threshold determined using at least one of the velocity and an altitude of the airborne platform.

6. The method of claim 1, wherein the detection process uses a CFAR technique in which a ground clutter plus noise is estimated using a priori ground clutter data.

7. The method of claim 6, wherein the noise is estimated at constant velocity using a Gaussian windowing.

8. The method of claim 1, wherein the electromagnetic wave is characterized by a Frequency Modulated Continuous Wave form.

9. The method of claim 1, wherein the wave frequency is between 9 GHz to 18 GHz.

10. A detecting system for detecting ground obstacles from an airborne platform comprising:
a transmit antenna configured to illuminate a whole field of view of interest with an electromagnetic wave in a range of 0.1 to 100 GHz;
multiple antenna elements configured to receive echoes from the whole field of view of interest and means for transforming the echoes into a digital signal for each of the multiple antenna elements;
means for combining the digital signals simultaneously in order to obtain simultaneously multiple beams covering the whole field of view of interest using spatial transformation processing;
filtering means for range and velocity filtering each beam in parallel over a long integration time so that a given ground obstacle is observed at different distances over the integration time;
detection means for applying on each filtered beam a detection process using a threshold on amplitude to detect potential ground obstacles; and
discriminating means for discriminating the ground obstacles from the potential ground obstacles in a range velocity diagram based on a velocity of the airborne platform and a height or elevation of the ground obstacles, wherein the height or elevation of a ground obstacle constitutes a specific signature in terms of both relative velocity and relative distance, wherein the height or elevation of an obstacle at a given range corresponds to a specific relative velocity which is distinct from that of ground obstacles at a same range and having a lower height or elevation, and wherein the height or elevation of an obstacle at a given relative velocity corresponds to a specific range which is distinct from that of ground obstacles having a same relative velocity and a lower height or elevation.

11. The detecting system of claim 10, wherein the discriminating means also uses altitude of the airborne platform.

12. The detecting system of claim 10, wherein the filtering means includes a range migration compensation process using the velocity and an altitude of the airborne platform.

13. The detecting system of claim 10, wherein the threshold is an adaptive threshold determined using at least one of the velocity and an altitude of the airborne platform.

14. A detecting system for detecting ground obstacles from an airborne platform comprising:
a transmit antenna configured to illuminate a whole field of view of interest with an electromagnetic wave in a range of 0.1 to 100 GHz;
multiple antenna elements configured to receive echoes from the whole field of view of interest;
a conversion device configured to transform the echoes into a digital signal for each of the multiple antenna elements;
a combining device configured to combine the digital signals simultaneously in order to obtain simultaneously multiple beams covering the whole field of view of interest using spatial transformation processing;
a filtering device configured to filter the data utilizing a range and velocity filtering process for each beam in parallel over a long integration time so that a given ground obstacle is observed at different distances over the integration time;
a detection device configured to apply on each filtered beam a detection process using a threshold on amplitude to detect potential ground obstacles; and
a discriminating device configured to discriminate the ground obstacles from the potential ground obstacles in a range velocity diagram based on a velocity of the airborne platform and a height or elevation of the ground obstacles, wherein the height or elevation of a ground obstacle constitutes a specific signature in terms of both relative velocity and relative distance, wherein the height or elevation of an obstacle at a given range corresponds to a specific relative velocity which is distinct from that of ground obstacles at a same range and having a lower height or elevation, and wherein the height or elevation of an obstacle at a given relative velocity corresponds to a specific range which is distinct from that of ground obstacles having a same relative velocity and a lower height or elevation.

15. The detecting system of claim 14, wherein the discriminating device is further configured to use altitude of the airborne platform.

16. The detecting system of claim 14, wherein the filtering device is further configured to utilize a range migration compensation process using the velocity and an altitude of the airborne platform.

17. The detecting system of claim 14, wherein the threshold is an adaptive threshold determined using at least one of the velocity and an altitude of the airborne platform.

18. The method of claim 1, wherein the step of discriminating is further based on an evolution of the specific signature.

* * * * *

UNITED STATES PATENT AND TRADEMARK OFFICE
CERTIFICATE OF CORRECTION

| | |
|---|---|
| PATENT NO. | : 8,519,882 B2 |
| APPLICATION NO. | : 12/939035 |
| DATED | : August 27, 2013 |
| INVENTOR(S) | : Albert Gezinus Huizing et al. |

Page 1 of 1

It is certified that error appears in the above-identified patent and that said Letters Patent is hereby corrected as shown below:

In the Claims

Claim 1, Column 10, Line 52:

please insert --using-- before "the detection system,"

Signed and Sealed this
Twentieth Day of May, 2014

Michelle K. Lee
*Deputy Director of the United States Patent and Trademark Office*